(12) United States Patent
Yagi et al.

(10) Patent No.: US 9,570,214 B2
(45) Date of Patent: Feb. 14, 2017

(54) SUPERCONDUCTING CABLE LINE

(75) Inventors: Masashi Yagi, Tokyo (JP); Shinichi Mukoyama, Tokyo (JP); Tokui Yonemura, Chiba (JP); Shuka Yonemura, legal representative, Chiba (JP); Tomoya Nomura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 13/816,615

(22) PCT Filed: Feb. 7, 2012

(86) PCT No.: PCT/JP2012/052738
§ 371 (c)(1),
(2), (4) Date: Feb. 12, 2013

(87) PCT Pub. No.: WO2012/108427
PCT Pub. Date: Aug. 16, 2012

(65) Prior Publication Data
US 2013/0165326 A1    Jun. 27, 2013

(30) Foreign Application Priority Data
Feb. 8, 2011    (JP) .................. 2011-024536

(51) Int. Cl.
*H01L 39/24*    (2006.01)
*H01B 12/02*    (2006.01)
*H02G 15/34*    (2006.01)

(52) U.S. Cl.
CPC ............. *H01B 12/02* (2013.01); *H02G 15/34* (2013.01); *Y02E 40/648* (2013.01)

(58) Field of Classification Search
CPC ................. H02G 15/34; H01B 12/02
(Continued)

(56) References Cited

U.S. PATENT DOCUMENTS

2005/0217878 A1\* 10/2005 Ashibe et al. ............... 174/15.5
2010/0021113 A1\* 1/2010 Ashibe ............................ 385/95
2010/0285968 A1\* 11/2010 Gregory ........................ 505/300

FOREIGN PATENT DOCUMENTS

JP    51 115488    9/1976
JP    52 65890    5/1977
(Continued)

OTHER PUBLICATIONS

Machine tranlsation of JP 2006-01547 (2006).\*
(Continued)

*Primary Examiner* — Paul Wartalowicz
(74) *Attorney, Agent, or Firm* — Oblon, McClelland, Maier & Neustadt, L.L.P.

(57) ABSTRACT

In a superconducting cable line in which a superconducting cable is connected to a terminal connecting part or an intermediate connecting part, an offset part in which a superconducting cable is laid in a curved-shape is provided near the terminal connecting part or the intermediate connecting part. Further, when it is assumed that the superconducting cable is movable in the offset part, an external tube of the superconducting cable is fixed such that a maximum amplitude part which maximizes the amount of movement of the superconducting cable following thermal expansion and contraction of a cable core becomes immovable.

9 Claims, 14 Drawing Sheets

(58) Field of Classification Search
USPC .......................................................... 505/230
See application file for complete search history.

(56) References Cited

FOREIGN PATENT DOCUMENTS

| | | |
|---|---|---|
| JP | 61 54810 | 3/1986 |
| JP | 4 49808 | 2/1992 |
| JP | 2000 331547 | 11/2000 |
| JP | 2006 14547 | 1/2006 |
| JP | 2009 140912 | 6/2009 |

OTHER PUBLICATIONS

International Search Report Issued Mar. 19, 2012 in PCT/JP12/52738 Filed Feb. 7, 2012.
International Preliminary Report on Patentability and Written Opinion of the International Searching Authority issued Mar. 19, 2012, in PCT/JP2012/052738, filed Feb. 7, 2012 (with English-language translation).
Combined Office Action and Search Report issued Apr. 13, 2015 in Chinese Patent Application No. 201280002041.3 (with English language translation).
Office Action issued Sep. 29, 2015 in Japanese Patent Application No. 2012-556898 (with English Translation).
Chinese Office Action issued Dec. 31, 2015 in Patent Application No. 201280002041.3 (with English Translation).

\* cited by examiner

SUPERCONDUCTING CABLE LINE

TECHNICAL FIELD

The present invention relates to a superconducting cable line which has a terminal connecting part or an intermediate connecting part.

BACKGROUND ART

Conventionally, there has been a known superconducting cable using a superconducting wire that can be in a superconducting state at cryogenic temperatures as a conductor. A superconducting cable is expected as a power cable capable of transmitting a large current with low loss, and has been developed for the practical use.

An example of a superconducting cable is illustrated in FIG. 2. A superconducting cable 10 illustrated in FIG. 2 is a single-core superconducting cable, in which a cable core 11 as the single core is housed in a thermal insulation tube 12.

The cable core 11 is composed of a former 111, superconductive conductor layers 112, an electric insulating layer 113, superconducting shield layers 114, a normal conducting shield layer 115, a protecting layer 116, and the like. The superconductive conductor layers 112 are formed by winding a plurality of superconducting wire materials spirally on the former 111. Similarly, the superconducting shield layers 114 are formed by winding a plurality of superconducting wire materials spirally on the electric insulating layer 113.

Each of superconducting wire materials for forming the superconductive conductor layers 112 and the superconducting shield layers 114 has a laminated structure obtained by forming an intermediate layer, a superconducting layer, a protecting layer in this order on a tape-shaped metal substrate, for example. As a superconductor for forming the superconducting layer may be a RE-based superconductor (RE: rare earth element) showing superconductivity at a liquid nitrogen temperature (−196° C. in the atmospheric pressure) or more, for example. An yttrium-based superconductor (Y-based superconductor, hereinafter) expressed as the chemical formula $YBa_2Cu_3O_{7-y}$, is especially typical.

The thermal insulation tube 12 has a double tube structure constituted of an internal tube 121 and an external tube 122. Between the internal tube 121 and the external tube 122, a multilayer thermal insulator (Super Insulation) 123 is interposed and vacuumed. In addition, the outer periphery of the external tube 122 is covered by a corrosion-resistant layer 124 of polyvinyl chloride (PVC), polyethylene, or the like.

During a steady operation of the superconducting cable 10, a cooling medium such as liquid nitrogen is circulated inside the internal tube 121, and thus transmitted electric current flows into the superconductive conductor layers 112 at a very low temperature.

At such a portion at which the superconducting cable 10 and a practical system such as a power device are connected, terminal processing is applied using a terminal connecting part. In the terminal connecting part, an end of the superconducting cable 10 is housed in a low temperature container which serves as a low temperature part, and is connected to the practical system which serves as a normal temperature part through a current lead.

Further, at such a portion at which the superconducting cables 10 are connected, terminal processing is applied using an intermediate connecting part. In the intermediate connecting part, two superconducting cables 10 are introduced in the low temperature container, and cable cores 11 are connected inside the low temperature container.

In the superconducting cable line having the terminal connecting part or intermediate connecting part above explained, the superconducting cable 10 is cooled from the normal temperature to a liquid nitrogen temperature or is heated from the liquid nitrogen temperature to the normal temperature upon assembly or maintenance. It is known that, under such a heat cycle, the cable core 11 thermally expands and contracts at about 0.3% of the length of the superconducting cable.

Particularly, in the terminal connecting part or the intermediate connecting part, when the cable core 11 has difficulty in moving in a longitudinal direction, and when the cable core 11 thermally expands and contracts, a local stress applies to the superconducting cable 10. Further, buckling occurs in superconducting wire materials forming the superconducting conductor layers 112 and the superconducting shield layers 114, and performance of the superconducting cable 10 significantly decreases.

Hence, a technique has been proposed which absorbs thermal expansion and contraction of a cable core by connecting superconducting conductor layers and current leads using connection terminals such as braided wires having flexibility (flexible connection terminals) in the terminal connecting part (see, for example, Patent Literature 1). Further, a technique has been proposed which absorbs thermal expansion and contraction of a cable core by providing an offset to a superconducting cable in a terminal connecting part or allowing the terminal connecting part to slide in the longitudinal direction of the superconducting cable.

Furthermore, a method has been proposed which provides offset parts on both sides of an intermediate connecting part and, when distortion is produced in a superconducting cable due to thermal expansion and contraction of a cable core, cancels distortion by moving the intermediate connecting part up or down (see, for example, Patent Literature 2). The offset part means a method of laying a cable in a meandering manner so as to absorb thermal expansion and contraction of the cable.

PRIOR ART

Patent Literature

Patent Literature 1: JP 2009-140912A
Patent Literature 2: JP 2000-331547A

SUMMARY OF THE INVENTION

Problem to be Solved by the Invention

By the way, in an actual superconducting cable line, a superconducting cable does not move over the entire line following thermal expansion and contraction of the cable core but there is an immobile region (a region in which the superconducting cable does not move). That is, the terminal connecting part or the intermediate connecting part is influenced by thermal expansion and contraction of the cable core in a region closest to the immobile region. Hence, by predicting the immobile region in the superconducting cable line and predicting a thermal expansion and contraction length of the cable core appearing in the terminal connecting part or the intermediate connecting part, the terminal connecting part or the intermediate connecting part is designed to absorb the thermal expansion and contraction distance.

However, the immobile region changes depending on, for example, a method of cooling the superconducting cable, a local inclination in the superconducting cable line and a friction coefficient, and therefore it is difficult to accurately learn the immobile region and predict the thermal expansion and contraction length of the cable core appearing in the terminal connecting part or the intermediate connecting part. Further, it is also known that the amount thermal contraction occurring in cooling process upon assembly and the amount of thermal expansion occurring in heating process upon maintenance are not equal (the immobile region changes upon cooling and heating).

As a result, it is necessary to design the terminal connecting part or the intermediate connecting part by estimating the thermal expansion and contraction with some margin, and therefore it is difficult to miniaturize the terminal connecting part or the intermediate connecting part. Further, when the terminal connecting part or the intermediate connecting part is made movable, it causes a trouble for connecting with another device or fixation on a mount and is difficult to be put into practical use.

The present invention is made to solve the above problem, and it is an object of the present invention to provide a superconducting cable line which can easily predict a thermal expansion and contraction length of a cable core appearing in a terminal connecting part or an intermediate connecting part under a heat cycle, and which can downsize the terminal connecting part or the intermediate connecting part.

Means to Solve the Problem

An invention according to a first aspect of the present invention is a superconducting cable line in which a superconducting cable, being formed by housing a cable core in a thermal insulation tube, is laid and connected to a terminal connecting part or an intermediate connecting part. The cable core includes a superconducting conductor layer and the thermal insulation tube includes an external tube and an internal tube. The superconducting cable line includes an offset part in which the superconducting cable is laid in a curved-shape so as to absorb a thermal expansion and contraction length of the cable core, and a fixed part in which a part of the external tube in the offset part is fixed.

For example, the superconducting cable line includes an offset part near the terminal connecting part or the intermediate connecting part.

Here, "near" means a distance in which a compact connecting part is realized and 30 m when, for example, the thermal expansion and contraction length is 10 cm or less. Consequently, as long as the setting of the offset part is allowed, the distance may be 50 m (the thermal expansion and contraction length is 15 cm) or 100 m (the thermal expansion and contraction length is 30 cm).

With an invention according to a second aspect of the present invention, in the superconducting cable line according to the first aspect of the present invention, the fixed part exists in a region selected from a group consisting of a region which includes a point on a curve of an arc apart farthest in a vertical direction with respect to a line connecting inflection points of the curve forming ends of the arc forming the offset part, and a region between the inflection points and the point on the curve.

With an invention according to a third aspect of the present invention, in the superconducting cable line according to the second aspect of the present invention, a difference between a length at 40° C. and a length at −196° C. of a cable core from the point on the curve to an end of the superconducting cable connected to the terminal connecting part or the intermediate connecting part closest to the point on the curve is "a", and an extended length of the cable core, from the length of the cable core at −196° C., which the terminal connecting part or the intermediate connecting part can receive is "x". The point on the curve is arranged in a range satisfying x ≥a.

Here, "can receive" refers to a state in which electrical and mechanical performance in a connecting part (a terminal connecting part or an intermediate connecting part) can be maintained.

Further, "40° C." refers to a temperature which assumes the temperature of the outdoor air in summer.

With an invention according to a fourth aspect of the present invention, in the superconducting cable line according to the second aspect of the present invention, a length of a cable core at −196° C. from the point on the curve to an end of the superconducting cable in the terminal connecting part or the intermediate connecting part closest to the point on the curve is "X", and an extended length of the cable core, from the length of the cable core at −196° C., which the terminal connecting part or the intermediate connecting part can receive is "x". The point on the curve is arranged in a range satisfying x ≥X ×0.003.

Here, "can receive" refers to a state in which electrical and mechanical performance in a connecting part (a terminal connecting part or an intermediate connecting part) can be maintained.

With an invention according to a fifth aspect of the present invention, in the superconducting cable line according to any one of the first to fourth aspects of the present invention, there exists a plurality of curve of the arcs forming the offset part, the fixed part is provided at a position selected from a group consisting of a position on the curve of an arc closest to the terminal connecting part or the intermediate connecting part, on the curve of a second closest arc, and on the curve of an arc having a longest length between a line connecting the inflection points and the point on the curve among the plurality of curve of the arcs.

Here, the curved shape of the arc forming the offset part refers to a curved shape partitioned at inflection points.

With an invention according to a sixth aspect of the present invention, in the superconducting cable line according to any one of the first to fifth aspects of the present invention, the offset part has a snake offset structure.

With an invention according to a seventh aspect of the present invention, in the superconducting cable line according to any one of the first to fifth aspects of the present invention, the offset part has a bent offset structure.

Advantageous Effects of the Invention

According to the present invention, by fixing an offset, which had been allowed to move freely for absorbing thermal expansion and contraction of a cable core, a specific portion in the superconducting cable line can be regarded as an immobile region upon cooling and heating, so that it is possible to easily predict and manage a thermal expansion and contraction length of the cable core in a terminal connecting part or an intermediate connecting part. Consequently, it becomes easy to design the terminal connecting part or the intermediate connecting part and possible to downsize the terminal connecting part or the intermediate connecting part.

EMBODIMENTS TO CARRY OUT THE INVENTION

Hereinafter, an embodiment of the present invention will be described in detail based on the attached drawings.

Figure 1:
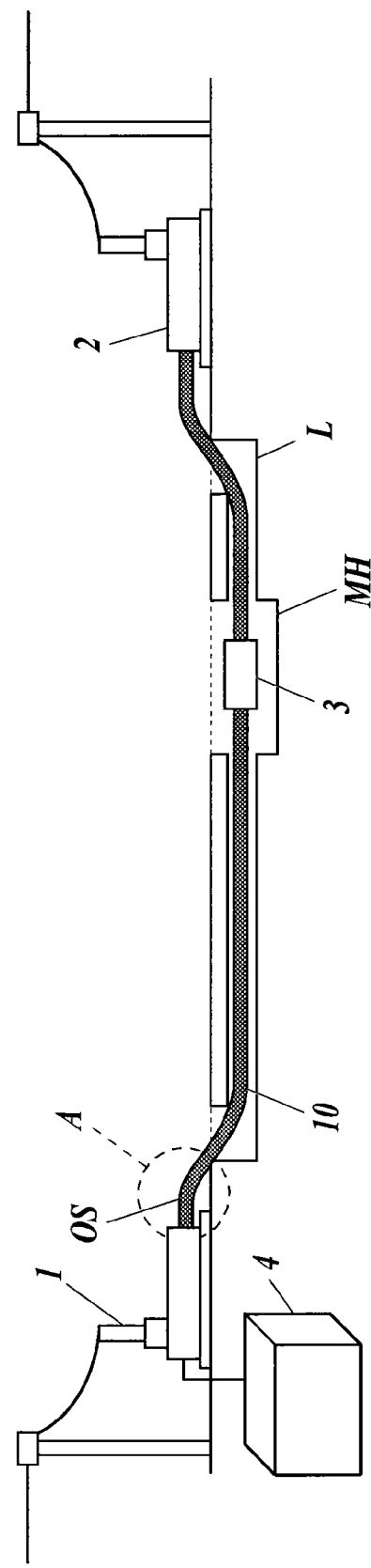
FIG. 1 is a view illustrating a schematic configuration of a superconducting cable line according to an embodiment.

FIG. 1 is a view illustrating a schematic configuration of a superconducting cable line according to an embodiment. As illustrated in FIG. 1, with a superconducting cable line S, a superconducting cable 10 is laid in a tube conduit L provided in the ground. Further, terminal connecting parts 1 and 2 for leading power to a practical system are provided at both ends of the superconducting cable 10, and the two superconducting cables 10 and 10 are connected through an intermediate connecting part 3 in a manhole MH. Furthermore, the terminal connecting part 1 is connected with a cooling system 4 to circulate and supply cooling medium (for example, liquid nitrogen) in the superconducting cable 10.

With the present embodiment, an offset part OS is provided near the terminal connecting parts 1 and 2 or the intermediate connecting part 3 (for example, a region A in FIG. 1), and, by fixing the superconducting cable 10 at a specific site in the offset part OS, an immobile region is intentionally formed in the superconducting cable line S. By this means, it is possible to easily predict a thermal expansion and contraction length of a cable core appearing in the terminal connecting part or the intermediate connecting part and, consequently, it is easy to design the terminal connecting part or the intermediate connecting part and it is possible to downsize the terminal connecting part or the intermediate connecting part.

Figure 2:
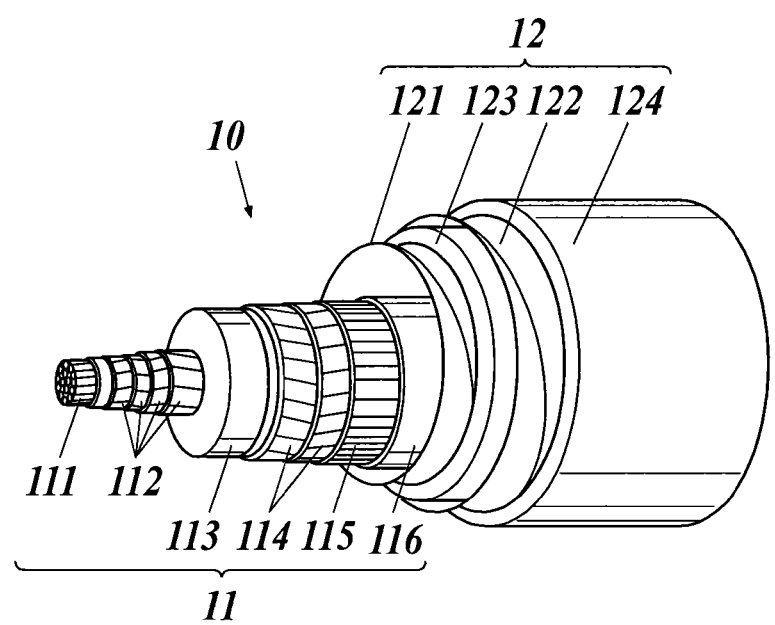
FIG. 2 is a view illustrating an example of a superconducting cable in a superconducting cable line.

FIG. 2 is a view illustrating an example of a superconducting cable 10 in the superconducting cable line S. The superconducting cable 10 illustrated in FIG. 2 is a single-core superconducting cable, in which a cable core 11 as the single core is housed in a thermal insulation tube 12. The cable core 11 is composed of a former 111, superconductive conductor layers 112, an electric insulating layer 113, superconducting shield layers 114, a normal conducting shield layer 115, a protecting layer 116, and the like.

The former 111 is a core for winding to form the cable core 11, and may be structured by twisting normal conducting wire materials such as copper wires, for example, together. Into the former 111, fault current flowing through the superconductive conductor layers 112 upon short circuit is branched.

The superconductive conductor layers 112 are formed by winding a plurality of superconducting wire materials spirally on the former 111. In FIG. 2, the superconductive conductor layers 112 have a laminated structure of four layers. Through the superconductive conductor layers 112, transmitted electric current flows during a steady operation.

Each of superconducting wire materials for forming the superconductive conductor layers 112 has a laminated structure obtained by forming an intermediate layer, a superconducting layer, a protecting layer in this order on a tape-shaped metal substrate, for example. As a superconductor for forming the superconducting layer, a RE-based superconductor (RE: rare earth element) showing superconductivity at a liquid nitrogen temperature or more can be used. An example of such RE-based superconductor may be a Y-based superconductor expressed as the chemical formula $YBa_2Cu_3O_{7-y}$.

The electric insulating layer 113 is made of an insulating paper, a semi-synthesized paper obtained by joining an insulating paper and a polypropylene film, a polymer nonwoven tape, or the like, for example and is formed by winding it on the superconductive conductor layers 112.

The superconducting shield layers 114 are formed by winding a plurality of superconducting wire materials spirally on the electric insulating layer 113. In FIG. 2, the superconducting shield layers 114 have a laminated structure of two layers. Substantially the same current as conductor current flows through the superconducting shield layers 114 in opposite phase by an electromagnetic induction during a steady operation. As the superconducting wire materials for forming the superconducting shield layers 114, superconducting wire materials similar to those for the superconductive conductor layers 112 may be used.

The normal conducting shield layer 115 is formed by winding a normal conducting wire such as a copper wire on the superconducting shield layers 114. Fault current flowing through the superconducting shield layers 114 upon short circuit is branched into the normal conducting shield layer 115.

The protecting layer 116 is made of an insulating paper, a polymer non-woven fabric, or the like, for example and is formed by winding it on the normal conducting shield layer 115.

The thermal insulation tube 12 has a double tube structure constituted of an internal tube 121 in which the cable core 11 is housed and which is filled with a cooling medium (liquid nitrogen, for example) and an external tube 122 which is provided so as to cover the outer periphery of the internal tube 121.

The internal tube 121 and the external tube 122 are, for example, stainless steel corrugated tubes. Between the internal tube 121 and the external tube 122, a multilayer thermal insulator (Super Insulation) 123 formed by a laminated body of polyethylene films on which aluminum is deposited, for example, is interposed, and a region therebetween is maintained in a vacuum state. In addition, the outer periphery of the external tube 122 is covered by a corrosion-resistant layer 124 of polyethylene, or the like.

Figure 3:
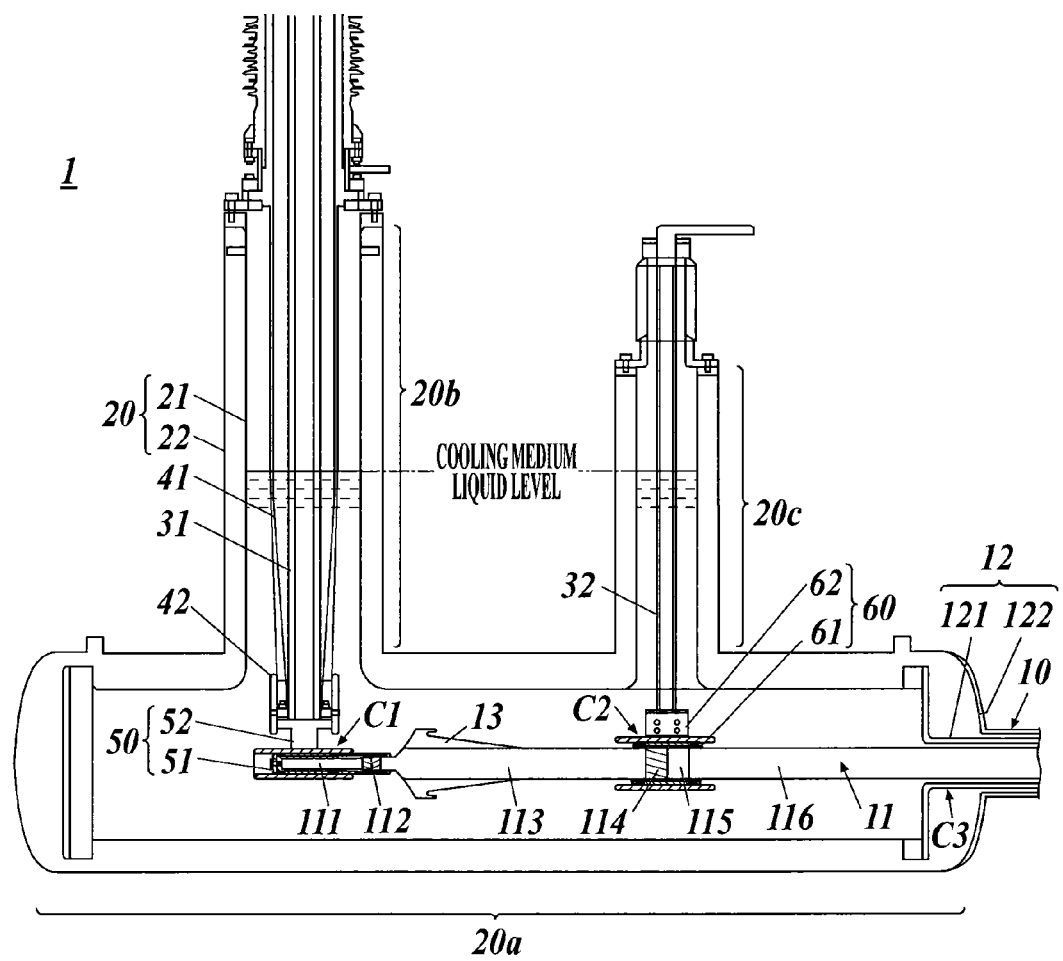
FIG. 3 is a view illustrating an example of a terminal connecting part in a superconducting cable line.

FIG. 3 is a view illustrating an example of a terminal connecting part 1 in the superconducting cable line S. The same also applies to the terminal connecting part 2.

As illustrated in FIG. 3, the terminal connecting part 1 employs a configuration in which an end of a superconducting cable 10 is housed in a low temperature container 20 in a predetermined state and a current is led to a practical system side through a conductor current lead 31 and a shield current lead 32.

In the terminal connecting part 1, the superconductive conductor layers 112 and the conductor current lead 31 of the superconducting cable 10 are electrically connected through a conductor movable connecting terminal 50 (conductor connecting part C1). The conductor movable connecting terminal 50 is a terminal for connecting the cable core 11 to the conductor current lead 31 in a state where the cable core 11 is movable in the longitudinal direction and is rotatable in the circumferential direction. The conductor movable connecting terminal 50 has, for example, a conductor plug 51 attached to the outer periphery of the superconducting conductor layers 112 and a conductor socket 52 to which the conductor plug 51 is movably attached.

An end of the conductor plug 51 portion of the conductor movable connecting terminal 50 in the terminal connecting part 1 corresponds to a cable end of the superconducting cable 10 (cable core 11).

Further, the superconducting shield layers 114 and the shield current lead 32 of the superconducting cable 10 are electrically connected through a shield movable connecting terminal 60 (shield connecting part C2). The shield movable connecting terminal 60 is a terminal for connecting the cable core 11 to the shield current lead 32 in a state where the cable core 11 is movable in the longitudinal direction and is rotatable in the circumferential direction. The shield movable connecting terminal 60 has a shield plug 61 attached to an outer periphery of the superconducting shield layers 114 and a shield socket 62 to which the shield plug 61 is movably attached.

That is, in the terminal connecting part 1, the cable core 11 is supported by the conductor connecting part C1 and the shield connecting part C2, and is movable in the longitudinal direction and is rotatable in the circumferential direction.

The low temperature container 20 adopts a double-structure formed with an inner cooling medium tank 21 and an outer vacuum tank 22, and is partitioned into an accommodating part 20a which houses the end of the superconducting cable 10 and cylindrical lead parts 20b and 20c which are vertically provided to the accommodating part 20a. Further, in the low temperature container 20 (the cooling medium tank 21 and the vacuum tank 22), a hand hole (not illustrated) which can be sealed airtight is formed such that an operator can work from an outside upon working.

The conductor current lead 31 and the shield current lead 32 are conductors for leading currents from the superconducting cable 10 to the practical system, and is formed using, for example, a copper tube material. The conductor current lead 31 is provided being hanged down in the lead part 20b of the low temperature container 20, and the shield current lead 32 is provided being hanged down in the lead part 20c. In addition, the conductor current lead 31 and the shield current lead 32 may be formed using conductive solid wires.

In the outer periphery of the conductor current lead 31, a bushing 41 made of, for example, fiber reinforced plastics (FRP) is provided, and, at a lower end of the conductor current lead 31 (a connecting part with the conductor movable connecting terminal 50), an electrode shield 42 is provided. That is, a high voltage is applied to the conductor current lead 31 and therefore, an electrical insulation between the low temperature container 20 to be earthed is maintained by providing the bushing 41 and the electrode shield 42.

In the outer periphery of the electric insulating layer 113 of the cable core 11 positioned between the conductor connecting part C1 and the shield connecting part C2, an electric field relaxing layer 13 formed with an epoxy bellmouth and a stress cone is formed. The end of the superconducting cable 10 is put in the accommodating part 20a of the low temperature container 20 and is immersed in a cooling medium (for example, liquid nitrogen). In this case, the internal tube 121 of the superconducting cable 10 is connected to an outer wall of the cooling medium tank 21, and the external tube 122 is connected to an outer wall of the vacuum tank 22 (cable connecting part C3). The internal tube 121 and the cooling medium tank 21, and the external tube 122 and the vacuum tank 22 are connected by way of, for example, welding or bolting.

During the steady operation, a cooling medium is circulated in and supplied to an interior of the internal tube 121 of the superconducting cable 10 and the cooling medium tank 21 communicating to the inside of the internal tube 121 by a cooling system 4 (see FIG. 1). Further, a gap between the internal tube 121 and the external tube 122 of the superconducting cable 10 and the vacuum tank 22 communicating to the gap are maintained in a vacuum state by a vacuum pump (not illustrated).

In the terminal connecting part 1, the cable core 11 of the superconducting cable 10 is supported at three portions of the conductor connecting part C1, the shield connecting part C2 and the cable connecting part C3.

In addition, positions (heights) of the conductor connecting part C1, the shield connecting part C2 and the cable connecting part C3 are adjusted such that the cable core 11 is supported straight in a horizontal state. Further, when intervals between the conductor connecting part C1, the shield connecting part C2 and the cable connecting part C3 to support the cable core 11 are too long, the cable core 11 deflects and the horizontal state is not kept and therefore the support intervals of the cable core 11 are desirably 2 m or less.

Although the cable core 11 also expands and contracts in a radial direction in cooling process or heating process upon assembly or maintenance, the amount of expansion and contraction in this case is several mm and therefore, as long as the positions of the conductor connecting part C1, the shield connecting part C2 and the cable connecting part C3 are adjusted substantially the same, the horizontal state of the cable core 11 is not remarkably lost. That is, movement of the cable core 11 in the longitudinal direction is not blocked by thermal expansion and contraction of the cable core 11 in the radial direction.

Thus, in the terminal connecting part 1, the cable core 11 is movable in the longitudinal direction, so that it is possible to effectively absorb thermal expansion and contraction of the cable core 11 occurring in cooling process or heating process upon assembly or maintenance. Further, the cable core 11 is rotatable in a circumferential direction, so that it is possible to absorb a twist to be applied to the cable core 11 due to a residual stress when the superconducting cable 10 is manufactured or laid. Consequently, a local stress does not concentrate following thermal expansion and contraction or a twist of the cable core 11 and the superconducting conductor layers 112 or the superconducting shield layers 114 do not buckle, so that it is possible to maintain integrity of the superconducting cable 10.

Figure 4:
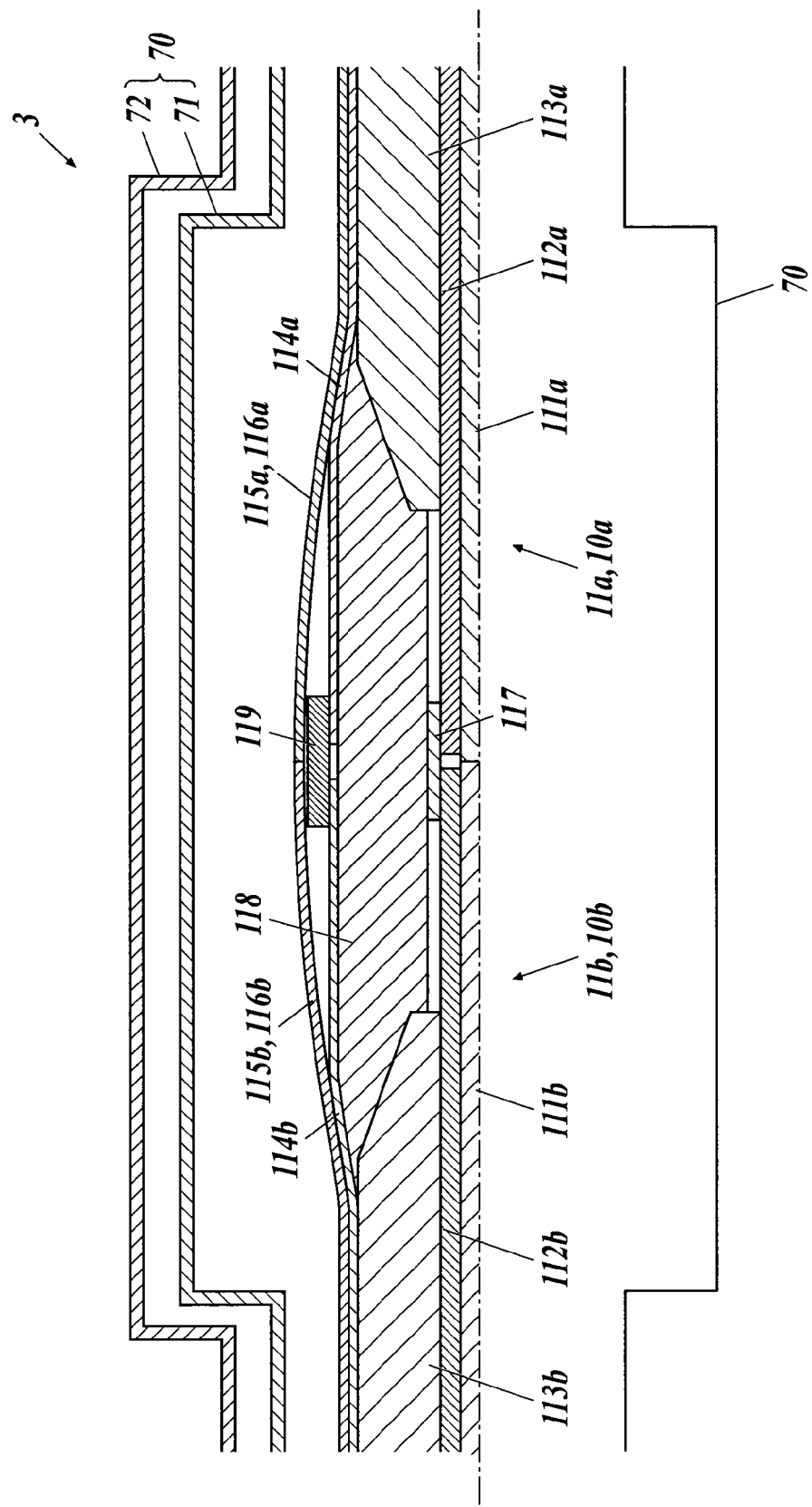
FIG. 4 is a view illustrating an example of an intermediate connecting part in a superconducting cable line.

FIG. 4 is a view illustrating an example of the intermediate connecting part 3 in the superconducting cable line S. FIG. 4 illustrates a cross section of an approximately upper half of the intermediate connecting part 3. Further, to distinguish the two superconducting cables to be connected, indices "a" and "b" are assigned to a reference numeral of a component of each superconducting cable.

As illustrated in FIG. 4, the intermediate connecting part 3 employs a configuration where cable ends of two superconducting cables 10a and 10b are housed in a low temperature container 70 in a predetermined state, and cable cores 11a and 11b corresponding to the cable ends are connected in the low temperature container 70.

Formers 111a and 111b are connected by way of, for example, welding with end surfaces facing to each other. Superconducting conductor layers 112a and 112b are spaced a predetermined length apart and arranged with end surfaces facing to each other, and are connected by having a conducting connecting superconducting wire material 117 bridge from the superconducting conductor layer 112a to the superconducting conductor layer 112b and bonding the superconducting wire material 117 by way of soldering.

Reinforcing insulating paper (for example, kraft paper) 118 is wound between electric insulating layers 113a and 113b. Similar to connection of the superconducting conductor layers 112a and 112b, superconducting shield layers 114a and 114b are spaced a predetermined length apart and arranged with the end face facing to each other, and are connected by having a shield connecting superconducting wire material 119 bridge from the superconducting shield layer 114a to the superconducting shield layer 114b and bonding the shield connecting superconducting wire material 119 by way of soldering.

Normal conducting shield layers 115a and 115b are pressed fit and connected using copper braided wires (not illustrated). Further, a protecting layer (not illustrated) is wound between protecting layers 116a and 116b.

In addition, as described above, the terminal connecting part 1 has movable connecting terminals (the conductor movable connecting terminal 50 and the shield movable connecting terminal 60) and, consequently, can absorb the thermal expansion and contraction length of the cable core 11 to some degree.

Meanwhile, the intermediate connecting part 3 does not have a movable connecting terminal unlike the terminal connecting part 1.

A cable connecting portion of the intermediate connecting part 3 is thick compared to another cable core 11, cannot be put in the internal tube 121 of the cable and is housed in a special box (low temperature container 70) (see FIG. 4). When a slope portion (thick portion) of the cable connecting portion hits the internal tube 121 or an inner side of the box due to thermal expansion and contraction of the cable core 11 and is deformed, an insulating function of the connecting portion does not work as expected. Hence, preferably, the cable connecting portion is left housed in the box without movements. Hence, offsets are desirably provided on both sides of the intermediate connecting part 3, and it is demanded that thermal expansion and contraction of the cable core 11 can be predicted and thermal expansion and contraction on both sides can be adjusted to the same degree.

Therefore, an absorption allowable length of thermal expansion and contraction of the cable core 11 which is allowable in the intermediate connecting part 3 becomes deflection of a cable core connecting portion in a range which the cable core connecting portion in the box does not contact the inner side of the box. This is because (1) the allowable length of thermal expansion and contraction of the cable core 11 of the intermediate connecting part 3 is limited (the cable core connecting portion hits the inner side of the box) and (2) thermal expansion and contraction lengths of the cable core 11 on both sides of the intermediate connecting part 3 are demanded to be substantially the same (the connecting portion which is thick compared to a normal cable core is displaced from the box to a tube side and stuck in the narrow tube).

The low temperature container 70 adopts a double-structure formed with an inner cooling medium tank 71 and an outer vacuum tank 72. Similar to the terminal connecting part 1, the internal tube 121 of the superconducting cable 10 is connected to an outer wall of the cooling medium tank 71, and the external tube 122 is connected to an outer wall of the vacuum tank 72. The internal tube 121 and the cooling medium tank 21, and the external tube 122 and the vacuum tank 22 are connected by way of, for example, welding or bolting.

During the steady operation, a cooling medium is circulated in and supplied to an interior of the internal tube 121 of the superconducting cable 10 and the cooling medium tank 71 communicating to the interior, and the gap between the internal tube 121 and the external tube 122 of the superconducting cable 10 and the vacuum tank 72 communicating to the gap are kept in the vacuum state.

Figure 5:
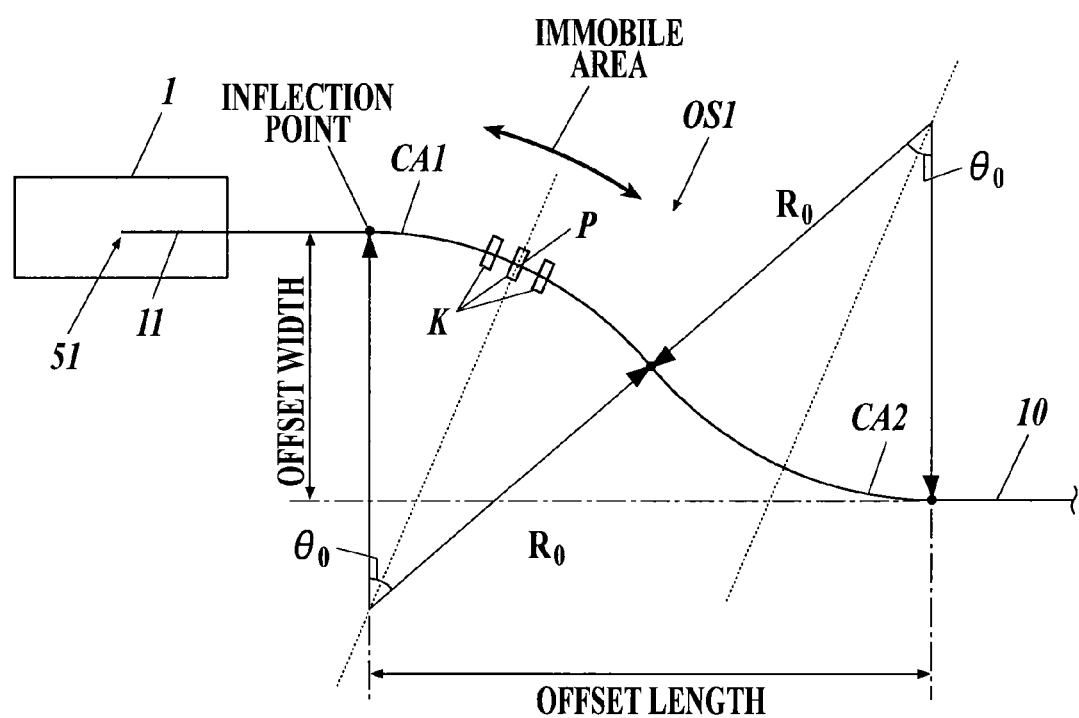
FIG. 5 is a view illustrating an example of an offset part provided near a terminal connecting part.

FIG. 5 is a view illustrating an example of the offset part OS provided near the terminal connecting part 1 (for example, the region A in FIG. 1). An offset part OS1 illustrated in FIG. 5 is an S-shaped offset which an upwardly convex arc CA1 smoothly continues to a downwardly convex arc CA2, each arc having a radius of $R_0$ and a center angle of $\theta_0$. Further, in this offset part OS1, the external tube 122 of the superconducting cable 10 is fixed by three fixing members K such that a maximum amplitude part P (or a maximum displacing part P) of the superconducting cable 10 meeting the center of the arc CA1 becomes immovable. A portion at which part of the external tube 122 of the offset part OS1 is fixed by the fixing members K is a fixed part.

The maximum displacing part P refers to a portion of the cable core which displaces the most in a vertical direction with respect to a line connecting inflection points positioned on both ends of a curved shape of the arc forming the offset part OS1.

A cable cleat is usually used for a fixing member for a cable. By sandwiching a cable with a cable cleat and fixing the cable cleat to a mount, the external tube 122 of the cable is fixed. The external tube 122 is fixed at a room temperature or during cooling (heating). Although the amount of expansion and contraction with respect to the connecting part can be reduced by fixing the external tube at the room temperature, a heat invasion rate at the fixed part increases. Meanwhile, although the heat invasion rate at the fixed part is low if the external tube is fixed during cooling process, the cable core moves unless it is fixed, and the amount of expansion and contraction with respect to the connecting part increases.

When the outer diameter of the superconducting cable 10 is D, a bend radius of the offset part OS1 is desirably 15D to 20 D or more. When, for example, the average outer diameter of the superconducting cable 10 is 150 mm, the bend radius of the offset part OS1 is 2250 mm to 3000 mm or more. These numerical values take the same values as numerical values required for development tests of bend radii of conventional cables (JEC standard JEC-3401).

When, for example, a thermal expansion and contraction length of a cable length from the maximum amplitude part P to a cable end (51) in the terminal connecting part 1 closest to the offset part OS1 is "a", and the absorption allowable distance at which the cable core 11 thermally expands and contracts in the terminal connecting part 1 is "x", the offset part OS1 is preferably provided in a range so as to satisfy x≥a. When, for example, a difference between a length at 25° C. and a length at −196° C. due to thermal expansion and contraction which is produced in the length of the cable core from a point on a curved shape of the arc forming the offset part OS1 to the cable end of the terminal connecting part or the intermediate connecting part closest to the point on the curved shape is "a", and an additional length of the cable core, from the length at −196° C., which the terminal connecting part or the intermediate connecting part can receive is "x", the point on the curved shape is arranged in a range satisfying x≥a.

More specifically, when the cable length from the maximum amplitude part P to the cable end (51) in the terminal connecting part 1 closest to the offset part OS1 is "X", and the absorption allowable distance at which the cable core 11 thermally expands and contracts in the terminal connecting part 1 is "x", the offset part OS1 is preferably provided in a range satisfying x≥X×0.003 (0.3%). When, for example, the length of the cable core at −196° C. from a point on the curved shape of the arc forming the offset part OS1 to the cable end of the terminal connecting part or the intermediate connecting part closest to the point on the curved shape is "X", and an additional length of the cable core, from the length at −196° C., which the terminal connecting part or the intermediate connecting part can be housed is "x", the point on the curved shape is arranged in a range satisfying x≥X×0.003.

By this means, the thermal expansion and contraction length appearing in the terminal connecting part 1 becomes short, so that it is possible to more precisely predict the thermal expansion and contraction length and downsize the terminal connecting part 1.

The maximum amplitude part P refers to a point on a curved shape of an arc which is spaced farthest apart in a vertical direction with respect to a line connecting inflection points positioned at both ends of the curved shape of the arc forming the offset part OS1. Furthermore, the inflection point refers to a point at which a bending direction changes in a curve of a curved shape of an offset part as illustrated in, for example, FIGS. 5 and 9 (black dots). Specifically, the inflection point refers to an inflection of a curve of a curved shape when an offset part is fixed or set again.

Figure 6:
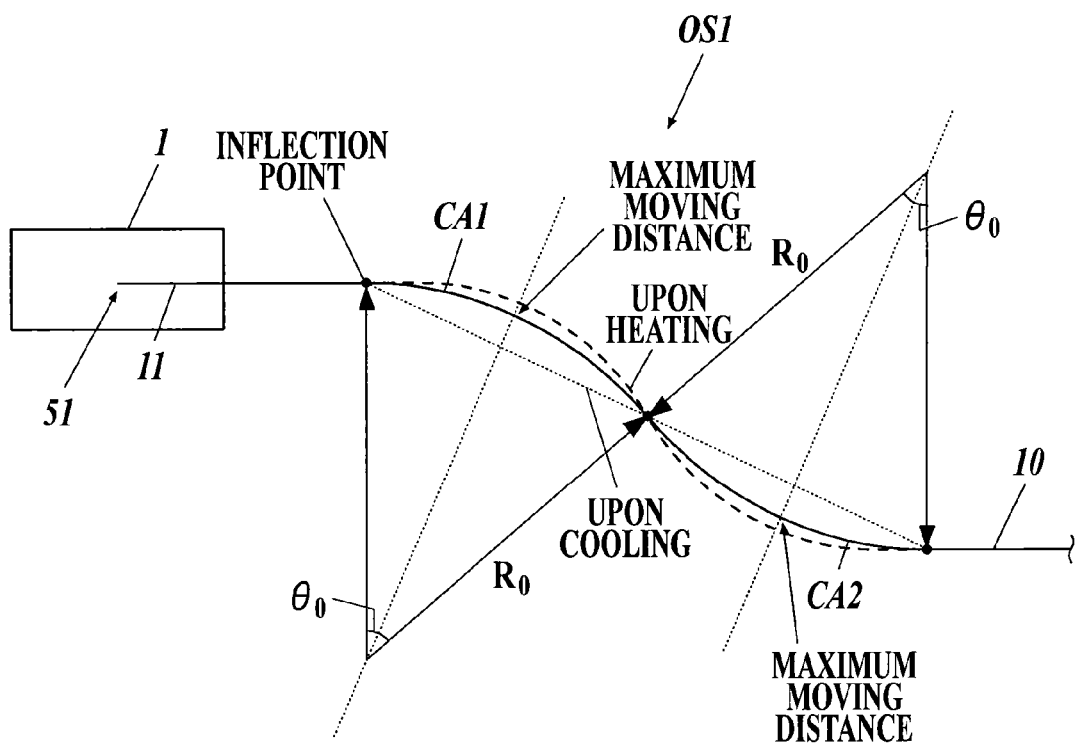
FIG. 6 is a view illustrating a deformed state of the superconducting cable in the offset part in FIG. 5.

Meanwhile, when the superconducting cable 10 is movable in the offset part OS1, the cable core 11 thermally contracts upon cooling and moves to an inside of a bend (in a direction in which the bend radius increases) as illustrated in FIG. 6. Further, following this movement, the internal tube 121 is pressed by the cable core 11 and the external tube 122 is further pressed, and the superconducting cable 10 is entirely deformed toward the inside such that the bend radii of the arcs CA1 and CA2 increase (the arcs CA1 and CA2 become straight). Meanwhile, upon heating, the cable core 11 thermally expands, and moves to an outside of a bend (in a direction in which the bend radius decreases). Further, following this movement, the internal tube 121 is pressed by the cable core 11 and the external tube 122 is then pressed, and the superconducting cable 10 is entirely deformed toward the outside such that the bend radii of the arcs CA1 and CA2 decrease.

In this case, the amount of movement (displacement) of the superconducting cable 10 becomes maximum at the centers of the arcs CA1 and CA2, and the offset part OS1 has the maximum amplitude with respect to the line connecting the inflection point at the end of CA1 and the inflection point at the end of CA2. When the cable core 11 thermally expands or contracts, the cable core 11 first abuts on the internal tube 121 at the centers of the arcs CA1 and CA2, and sequentially abuts on sites nearby. In a conventional superconducting cable line, the offset part OS1 is provided and the superconducting cable 10 is entirely deformed to absorb thermal contraction of the cable core 11.

By contrast with this, with the present embodiment, the maximum amplitude part P of the superconducting cable 10 is immovably fixed by the fixing members K. Accordingly, although the superconducting cable 10 tends to entirely deform toward an inside of a bend upon cooling, after the cable core 11 and the internal tube 121 move to the inside of the bend and abut on the external tube 122, the cable core 11 and the internal tube 121 are pressed against the external tube 122. Consequently, a significant friction resistance is produced in response to thermal contraction of the cable core 11, and movement of the cable core 11 is restricted. That is, the maximum amplitude part P of the superconducting cable 10 becomes an immobile point, and subsequently, the cable core 11 contracts toward the maximum amplitude part P.

Further, although the superconducting cable 10 tends to entirely deform toward an outside of a bend upon heating, after the cable core 11 and the internal tube 121 move to the outside of the bend and abut on the external tube 122, the cable core 11 and the internal tube 121 are pressed against the external tube 122. Consequently, a significant friction resistance is produced in response to thermal expansion of the cable core 11, and movement of the cable core 11 is restricted. That is, the maximum amplitude part P of the superconducting cable 10 becomes an immobile point, and subsequently, the cable core 11 expands toward the terminal connecting part 1 with respect to the maximum amplitude part P.

Thus, at the offset part OS1 illustrated in FIG. 5, when it is assumed that the superconducting cable 10 is movable, the maximum amplitude part P closest to the terminal connecting part 1 among maximum amplitude parts (the center of the arc CA1 and the center of the arc CA2) which maximize the amount of movement of the superconducting cable 10 following thermal expansion and contraction of the cable core 11 is immovably fixed.

By this means, a specific portion of the superconducting cable line S (a portion on the right side of the maximum amplitude part P (on the side opposite to the terminal connecting part 1)) can be regarded as an immobile region upon cooling and heating, so that it is possible to easily predict a thermal expansion and contraction length of the cable core 11 appearing in the terminal connecting part 1.

That is, the maximum amplitude part P is included in the immobile region at all times, and, also for the thermal expansion and contraction distance, the length from the maximum amplitude point P to the cable end 51 only needs to be taken into account.

Consequently, it is possible to design easily the terminal connecting part 1 based on the predicted thermal expansion and contraction length and downsize the terminal connecting part 1. More specifically, for example, the lengths and the positions of the conductor movable connecting terminal 50 (the conductor plug 51 and the conductor socket 52) and the shield movable connecting terminal 60 (the shield plug 61 and the shield socket 62) only need to be designed to such an extent that electric connection between the cable core 11 and the current leads 31 and 32 is not interrupted upon cooling or heating.

Figure 7:
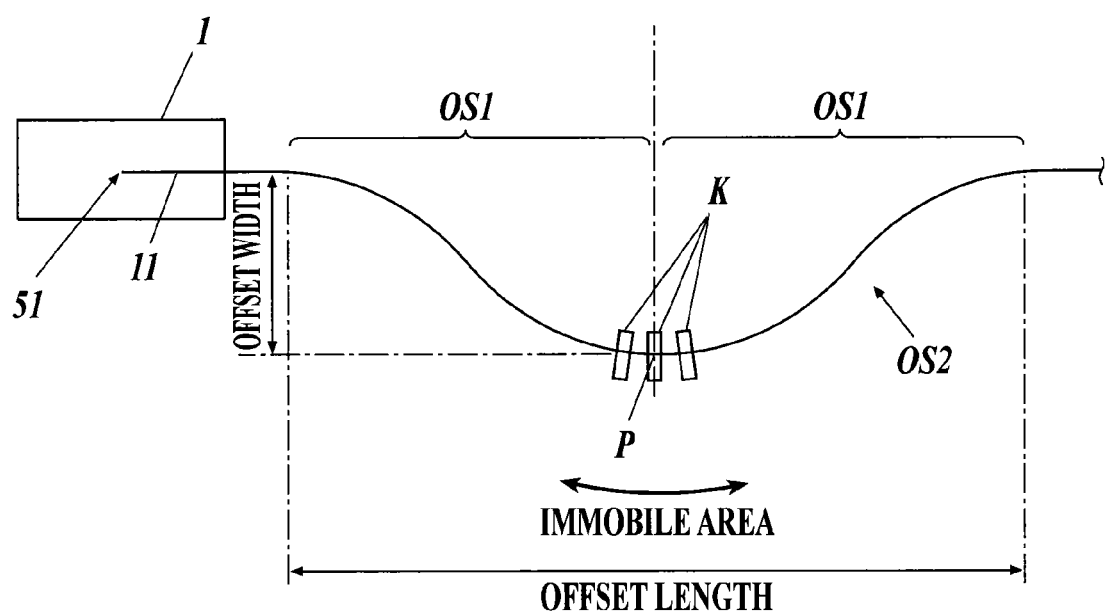
FIG. 7 is a view illustrating another example of the offset part provided near a terminal connecting part.

FIG. 7 is a view illustrating another example of the offset part OS provided near the terminal connecting part 1 (for example, the region A in FIG. 1). The offset part OS2 illustrated in FIG. 7 is a C-shaped offset provided to extend line-symmetrically with respect to the offset part OS1 illustrated in FIG. 5. Further, in this offset part OS2, the external tube 122 of the superconducting cable 10 is fixed by three fixing members K such that the maximum amplitude part P of the superconducting cable 10 corresponding to the lowermost point of the bend becomes immovable.

Similar to the S-shaped offset illustrated in FIG. 5, when the outer diameter of the superconducting cable 10 is D, a bend radius of the offset part OS2 is desirably 15 D or more.

When, for example, a thermal expansion and contraction length of a cable length from the maximum amplitude part P to a cable end (51) in the terminal connecting part 1 closest to the offset part OS2 is "a", and the absorption allowable length in the terminal connecting part 1 caused by the thermal expansion and contraction of the cable core 11 is "x", the offset part OS2 is preferably provided in a range satisfying x≥a.

More specifically, when the cable length from the maximum amplitude part P to the cable end (51) in the terminal connecting part 1 closest to the offset part OS2 is "X", and the absorption allowable length in the terminal connecting part 1 caused by the thermal expansion and contraction of the cable core 11 is "x", the offset part OS2 is preferably provided in a range satisfying x≥X×0.003 (0.3%).

Figure 8:
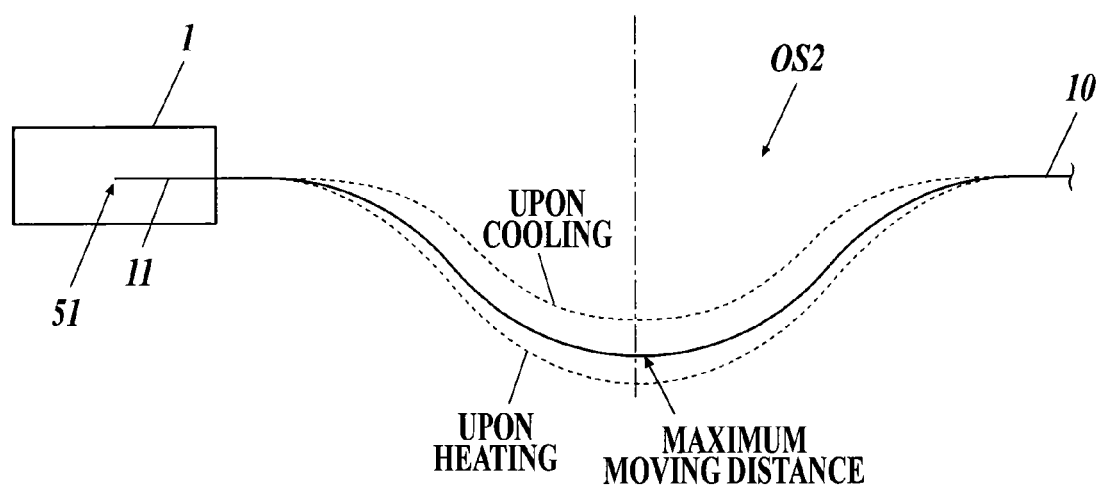
FIG. 8 is a view illustrating a deformed state of the superconducting cable in the offset part in FIG. 7.

Meanwhile, when the superconducting cable 10 is movable in the offset part OS2, the cable core 11 thermally contracts upon cooling and moves to an inside of a bend (in a direction in which the bend radius increases) as illustrated in FIG. 8. Further, following this movement, the internal tube 121 is pressed by the cable core 11 and the external tube 122 is further pressed, and the superconducting cable 10 is entirely deformed toward the inside such that the bend radius of the offset part OS2 increases (the offset part OS2 becomes straight). Meanwhile, upon heating, the cable core 11 thermally expands and contracts, and moves to an outside of a bend (in a direction in which the bend radius decreases). Further, following this movement, the internal tube 121 is pressed by the cable core 11 and the external tube 122 is further pressed, and the superconducting cable 10 is entirely deformed toward the outside such that the bend radius of the offset part OS2 decreases.

In this case, at the offset part OS2, the amount of movement (displacement) of the superconducting cable 10 maximizes at the lowermost point of the bend. That is, when the cable core 11 thermally expands and contracts, the cable core 11 first abuts on the internal tube 121 at the lowermost point of the bend, and sequentially abuts on sites nearby.

By contrast with this, with the present embodiment, the maximum amplitude part P of the superconducting cable 10 is immovably fixed by the fixing members K. Accordingly, although the superconducting cable 10 tends to entirely deform toward an inside of a bend upon cooling, after the cable core 11 and the internal tube 121 move to the inside of the bend and abut on the external tube 122, the cable core 11 and the internal tube 121 are pressed against the external tube 122. Consequently, a significant friction resistance is produced in response to thermal contraction of the cable core 11, and movement of the cable core 11 is restricted. That is, the maximum amplitude part P of the superconducting cable 10 becomes an immobile point, and, subsequently, the cable core 11 contracts toward the maximum amplitude part P.

Further, although the superconducting cable 10 entirely deforms toward an outside of a bend upon heating, after the cable core 11 and the internal tube 121 move to the outside of the bend and abut on the external tube 122, the cable core 11 and the internal tube 121 are pressed against the external tube 122. Consequently, a significant friction resistance is produced in response to thermal expansion of the cable core 11, and movement of the cable core 11 is restricted. That is, the maximum amplitude part P of the superconducting cable 10 becomes an immobile point, and subsequently, the cable core 11 expands toward the terminal connecting part 1 with respect to the maximum amplitude part P.

Thus, at the offset part OS2 illustrated in FIG. 7, when it is assumed that the superconducting cable 10 is movable, the maximum amplitude part P which maximizes the amount of movement of the superconducting cable following thermal expansion and contraction of the cable core 11 is immovably fixed. At the offset part OS2, a site at which the amount of movement of the superconducting cable following thermal expansion and contraction of the cable core 11 maximizes is only one site of this lowermost point of the bend, and this site becomes the maximum amplitude part.

By this means, a specific portion of the superconducting cable line S (both sides of the maximum amplitude part P) can be regarded as an immobile region upon cooling and heating, so that it is possible to easily predict a thermal expansion and contraction length of the cable core 11 appearing in the terminal connecting part 1.

That is, the maximum amplitude part P is included in the immobile region at all times and also the length from the maximum amplitude point P to the cable end 51 only needs to be taken into account for the thermal expansion and contraction length.

Consequently, it is possible to design easily the terminal connecting part 1 based on the predicted thermal expansion and contraction length and downsize the terminal connecting part 1.

The offset parts OS1 and OS2 illustrated in FIGS. 5 and 7 are examples, and the shapes of the offset parts OS provided near the terminal connecting part 1 are not limited to these. That is, at the offset part OS provided near the terminal connecting part 1, when it is assumed that the superconducting cable 10 is movable, it is sufficient that the maximum amplitude part P closest to the terminal connecting part 1 among sites at which the amount of movement of the superconducting cable 10 following thermal expansion and contraction of the cable core 11 becomes maximum is immovably fixed.

Further, at the offset parts OS1 and OS2, when the cable core 11 thermally expands and contracts, the cable core 11 and the internal tube 121 are pressed against the external tube 122, and therefore there is a concern that thermal insulation properties of the thermal insulation tube 12 of the superconducting cable 10 slightly decrease. In this case, as illustrated in FIG. 9, it is possible to prevent a decrease in thermal insulation properties of the thermal insulation tube 12 by utilizing a snake-shaped offset.

Figure 9:
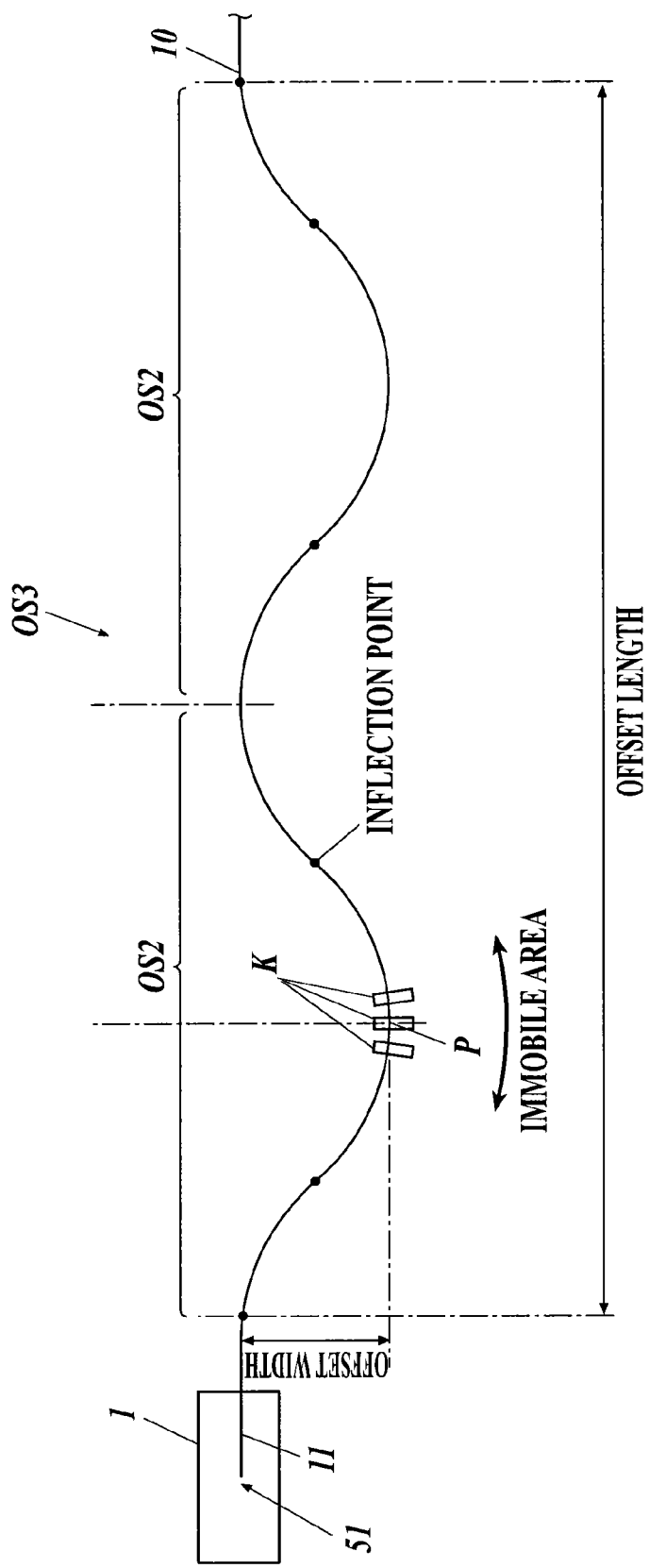
FIG. 9 is a view illustrating another example of the offset part provided near a terminal connecting part.

FIG. 9 is a view illustrating another example of the offset part OS provided near the terminal connecting part 1 (for example, the region A in FIG. 1). An offset part OS3 illustrated in FIG. 9 is a snake offset provided to extend line-symmetrically with respect to the offset part OS2 illustrated in FIG. 7. At the offset part OS3, the maximum amplitude part P is fixed immovably at the offset part OS2 on the terminal connecting part 1 side, and the superconducting cable 10 is movable on the right side of the maximum amplitude part P (on the side opposite to the terminal connecting part 1).

Consequently, it is possible to reduce a stress remaining in the superconducting cable 10 when the cable core 11 thermally expands and contracts and prevent the cable core 11 and the internal tube 121 from being excessively pressed against the external tube 122, so that local heat invasion to the cable core 11 is prevented. Particularly, it is possible to prevent local heat invasion to the cable core 11 upon cooling and, consequently, prevent a decrease in power transmission performance of the superconducting cable 10 due to heat invasion.

EXAMPLES

Figure 10:
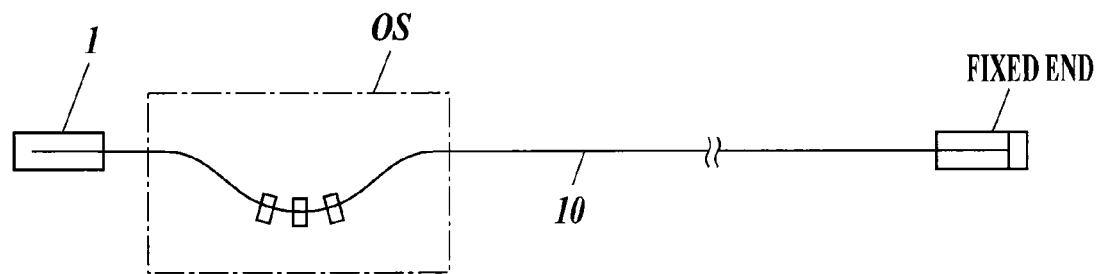
FIG. 10 is a view illustrating a superconducting cable line according to an Example.

According to Examples, a terminal connecting part 1 was connected to one end of a superconducting cable 10 having an outer diameter of 150 mm and a cable length of 50 m and the other end was a fixed end. The superconducting cable line was constructed to imitate from a terminal of an immobile region (corresponding to the fixed end) to the terminal connecting part 1 (see FIG. 10). And the amount of thermal contraction upon cooling from a room temperature to a liquid nitrogen temperature and the amount of thermal expansion upon heating from the liquid nitrogen temperature to the room temperature were compared by setting different-shaped offset parts OS (including a linear line). Specifically, an interior of the conductor movable connecting terminal 50 in the terminal connecting part 1 was observed using an observing device which utilized radiation such as X rays or γ rays to measure the amount of movement of the conductor plug 51 in the conductor socket 52. Further, the axial force produced at the fixed end upon cooling was measured, and residual stresses produced in the superconducting cable 10 following thermal contraction of the cable core 11 were compared.

In this case, when the superconducting cable 10 was fixed such that the maximum amplitude part becomes immovable at the offset part OS, the distance between the terminal connecting part 1 and the maximum amplitude part took the following value.

In addition, the bend radius of the offset part OS was 15 D (D: an outer diameter of the superconducting cable 10).

Further, an allowable bend radius (R), an offset width (F) and an offset length (L) of the cable has the following relationship of general expression (1).

$$L \geq \sqrt{(4RF - F^2)} \quad (1)$$

With Example 1, an S-shaped offset (see FIG. 5) was applied to the offset part OS, and the cable was fixed such that the maximum amplitude part closest to the terminal connecting part 1 became immovable.

Here, the cable outer diameter (D) was 150 mm, the allowable bend radius (R) was 2250 mm and the offset width (F) was 300 mm, and the offset length (L) was 1615.5 mm based on equation (1).

FIG. 5 illustrates an example of an offset length in a case where $L = \sqrt{(4RF - F^2)}$ is true in general expression (1).

In this case, the amount of thermal contraction upon cooling was 6 mm, and the amount of thermal expansion upon heating was 5.5 mm. Further, the axial force produced at the fixed end was 8000 N.

With Example 2, a C-shaped offset (see FIG. 7) was applied to the offset part OS, and the cable was fixed such that the maximum amplitude part became immovable.

FIG. 7 illustrates asymmetrical shape of the offset shape in FIG. 5. Hence, the length of the offset in FIG. 7 is twice the length of the offset in FIG. 5. Accordingly, the offset length (L)=1615.5 mm×2 mm=3231 mm was true.

(In addition, FIG. 7 illustrates an appropriation of the shape in FIG. 5, FIG. 7 illustrates the symmetrical shape of the offset shape in FIG. 5, and therefore $L = \sqrt{(4RF - F^2)}$ is not true in general expression (1).)

In this case, both of the amount of thermal contraction upon cooling and the amount of thermal expansion upon heating were 5 mm. Further, the axial force produced at the fixed end was 2000 N.

With Example 3, a snake offset (see FIG. 9) was applied to the offset part OS, and the cable was fixed such that the maximum amplitude part closest to the terminal connecting part 1 became immovable.

FIG. 9 illustrates asymmetrical shape of the offset shape in FIG. 7. Hence, the length of the offset in FIG. 9 is twice the length of the offset in FIG. 7. Accordingly, the offset length (L)=3231 mm×2 mm=6462 mm was true.

(In addition, FIG. 9 illustrates an appropriation of the shape in FIG. 5, FIG. 9 illustrates the symmetrical shape of the offset shape in FIG. 7, and therefore $L = \sqrt{(4RF - F^2)}$ is not true in general expression (1).)

In this case, both of the amount of thermal contraction upon cooling and the amount of thermal expansion upon heating were 5 mm. Further, the axial force produced at the fixed end was 500 N.

With Comparative Example 1, the superconducting cable 10 was linearly laid uniformly without providing an offset part OS. In this case, the amount of thermal contraction upon cooling was 60 mm, and the amount of thermal expansion upon heating was 150 mm. Further, the axial force produced at the fixed end was 10000 N.

With Comparative Example 2, a C-shaped offset which was the same shape as in that of Example 2 was applied to the offset part OS. Meanwhile, the superconducting cable is not fixed at the offset part OS. In this case, the amount of thermal contraction upon cooling was 25 mm, and the amount of thermal expansion upon heating was 50 mm. Further, the axial force produced at the fixed end was 500 N.

TABLE 1

| | EXAMPLE 1 | EXAMPLE 2 | EXAMPLE 3 | COMPARATIVE EXAMPLE 1 | COMPARATIVE EXAMPLE 2 |
|---|---|---|---|---|---|
| AMOUNT OF THERMAL EXPANSION AND CONTRACTION UPON COOLING (mm) | −6 | −5 | −5 | −60 | −25 |
| AMOUNT OF THERMAL EXPANSION AND CONTRACTION | 5.5 | 5 | 5 | 150 | 50 |

TABLE 1-continued

|  | EXAMPLE 1 | EXAMPLE 2 | EXAMPLE 3 | COMPARATIVE EXAMPLE 1 | COMPARATIVE EXAMPLE 2 |
|---|---|---|---|---|---|
| UPON HEATING (mm) |  |  |  |  |  |
| PRODUCED AXIAL FORCE UPON COOLING (N) | 8000 | 2000 | 500 | 10000 | 500 |

Table 1 illustrates evaluation results. The amount of thermal expansion and contraction in Table 1 indicates the amount of change before and after the temperature changes. In Comparative Example 1, the amount of change in thermal expansion and contraction upon heating becomes greater than the amount of change in thermal expansion and contraction upon cooling, and it is construed that immobile regions upon cooling and heating change. That is, it is construed that a portion which is an immobile region upon cooling did not become an immobile region upon heating, and therefore the amount of change in thermal expansion and contraction upon heating became greater than the amount change in thermal expansion and contraction upon cooling.

With Comparative Example 2, the amount of thermal expansion and contraction (thermal expansion and contraction length) appearing in the terminal connecting part 1 is about one third of that of Comparative Example 1. That is, thermal expansion and contraction of the cable core 11 is effectively absorbed by a change in the shape of the superconducting cable 10 at the offset part OS. However, the amounts of thermal expansion and contraction (thermal expansion and contraction lengths) appearing in the terminal connecting part 1 upon cooling and heating are different (the offset shape before cooling is not restored after heating), and therefore it is construed that immobile regions change upon cooling and heating.

When thermal expansion and contraction upon cooling and thermal expansion and contraction upon heating do not have an invertible relationship as in Comparative Examples 1 and 2, the terminal connecting part 1 needs to be designed by estimating the thermal expansion and contraction (thermal expansion and contraction length) with some margin, and therefore it is difficult to downsize the terminal connecting part 1.

Meanwhile, in Examples 1 to 3, the amounts of thermal expansion and contraction (thermal expansion and contraction lengths) appearing in the terminal connecting part 1 are substantially the same. That is, thermal expansion and contraction upon cooling and thermal expansion and contraction upon heating have an invertible relationship, so that it is possible to precisely predict the amount of thermal expansion and contraction (thermal expansion and contraction length) appearing in the terminal connecting part 1. Consequently, it is easy to design the terminal connecting part 1, and it is possible to downsize the terminal connecting part 1.

Further, with Examples 1 to 3, the superconducting cable 10 is movable at the offset part on the right side of the fixed maximum amplitude part, so that this portion can absorb thermal expansion and contraction by a change in the shape of the superconducting cable 10. With Example 2, the portion at which the superconducting cable 10 is movable is larger than that of Example 1 (the offset length is long), so that a residual stress produced in the superconducting cable 10 is reduced more than that of Example 1. Similarly, with Example 3, the portion at which the superconducting cable 10 is movable is larger than that of Example 2 (the offset length is long), so that a residual stress produced in the superconducting cable 10 is further reduced.

Further, although experiments were conducted using the cable length of 50 m with the above Examples, the same results were also obtained when the cable lengths were 100 m and 200 m. That is, even when cable lengths are different, only the length between the portion of the immobile region and the terminal needs to be taken into account by fixing the cable and setting the immobile region.

The invention made by the inventors has been described hereinbefore specifically based on the embodiment. However, the invention is not limited to the above embodiment and may be modified in the scope that does not deviate from the gist of the invention.

As described in the embodiment, the thermal expansion and contraction length appearing in the terminal connecting part 1 depends on the distance between the maximum amplitude part fixed to the offset part OS and the terminal connecting part 1, and therefore, when this distance is shorter, the thermal expansion and contraction length appearing in the terminal connecting part 1 can be made shorter. Meanwhile, if the amount of absorption of thermal expansion and contraction in the terminal connecting part 1 is sufficient, a site to provide the offset part OS in the superconducting cable line S is not limited in particular.

Further, although, with the embodiment, the maximum amplitude part is made immovable by fixing the superconducting cable 10 at three portions including the maximum amplitude part in the offset part OS, the number of portions to fix the superconducting cable 10 and an arrangement of the portions are by no means limited to these. For example, a plurality of portions near the maximum amplitude part may be fixed to eventually make the maximum amplitude part immovable. Further, when, for example, the axial force produced upon thermal expansion and contraction of the cable core 11 increases, the superconducting cable 10 may be fixed at three portions or more.

Furthermore, although a case has been described with the embodiment where the offset part OS is provided near the terminal connecting part 1, the offset parts OS to which the maximum amplitude part is immovably fixed may be provided near a terminal connecting part 2 and, in addition, near both ends of the intermediate connecting part 3. By this means, it is possible to easily predict and manage thermal expansion and contraction of the cable core 11 appearing in the terminal connecting part 2 and the intermediate connecting part 3.

Further, when the offset part OS is provided in the superconducting cable line S, fixing of the offset part OS may be adjusted stepwise upon cooling or heating. For example, fixing of the offset part maybe released temporarily at a stage when a temperature becomes a predetermined temperature (for example, −100° C.) upon cooling or heating and after the superconducting cable 10 is deformed to remove a residual stress, the offset part may be fixed again.

By this means, the residual stress produced in the superconducting cable 10 is reduced, so that local heat invasion to the cable core 11 is suppressed upon cooling. Consequently, it is possible to prevent a decrease in power transmission performance of the superconducting cable 10 due to heat invasion.

Cooling and heating were performed according to the above method in Example 2, and both of the amount of thermal contraction upon cooling and the amount of thermal expansion upon heating were 12 mm. Further, the axial force produced at the fixed end was 1000 N. Upon comparison with the result of Example 2, it was confirmed that, while the thermal expansion and contraction length was about twice, the produced axial force was half and the residual force produced in the superconducting cable 10 was reduced.

In addition, the amount of thermal contraction upon cooling and the amount of thermal expansion upon heating are the same, so that it is easy to predict the thermal expansion and contraction length appearing in the terminal connecting part 1 similarly to Example 2.

Further, although the superconducting cable line S in which the single-core superconducting cable 10 is laid has been described with the embodiment, the present invention is also applicable to the superconducting cable line S in which a triple-core integrated superconducting cable in which triple-core cable cores are collectively housed in a thermal insulation tube is laid.

Furthermore, the configuration of the terminal connecting parts 1 and 2 or the intermediate connecting part 3 of the superconducting cable line S is by no means limited to the embodiment. For example, in the terminal connecting parts 1 and 2, the superconducting conductor layers 112 and the conductor current lead 31 of the cable core 11, or the superconducting shield layers 114 and the shield current lead 32 may be connected using a connecting terminal having flexibility (flexible connecting terminal).

Figure 11:
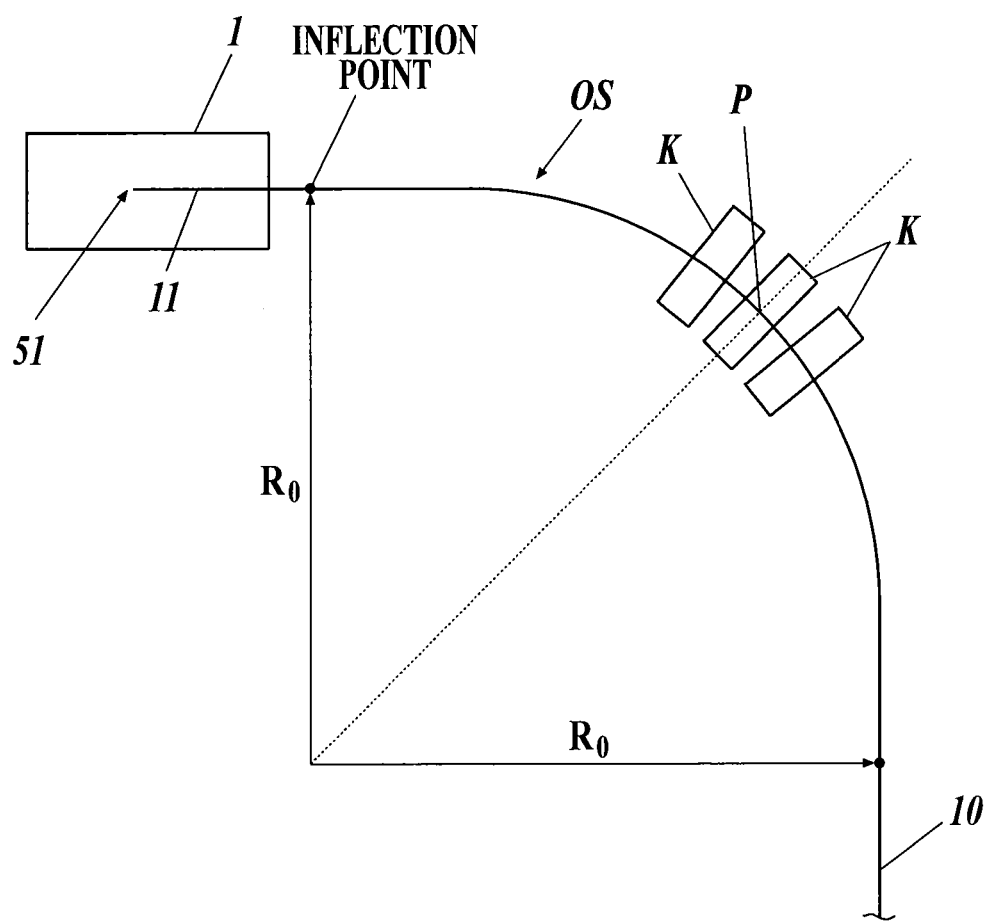
FIG. 11 is a view illustrating an example of the offset part provided near a terminal connecting part.
Figure 12:
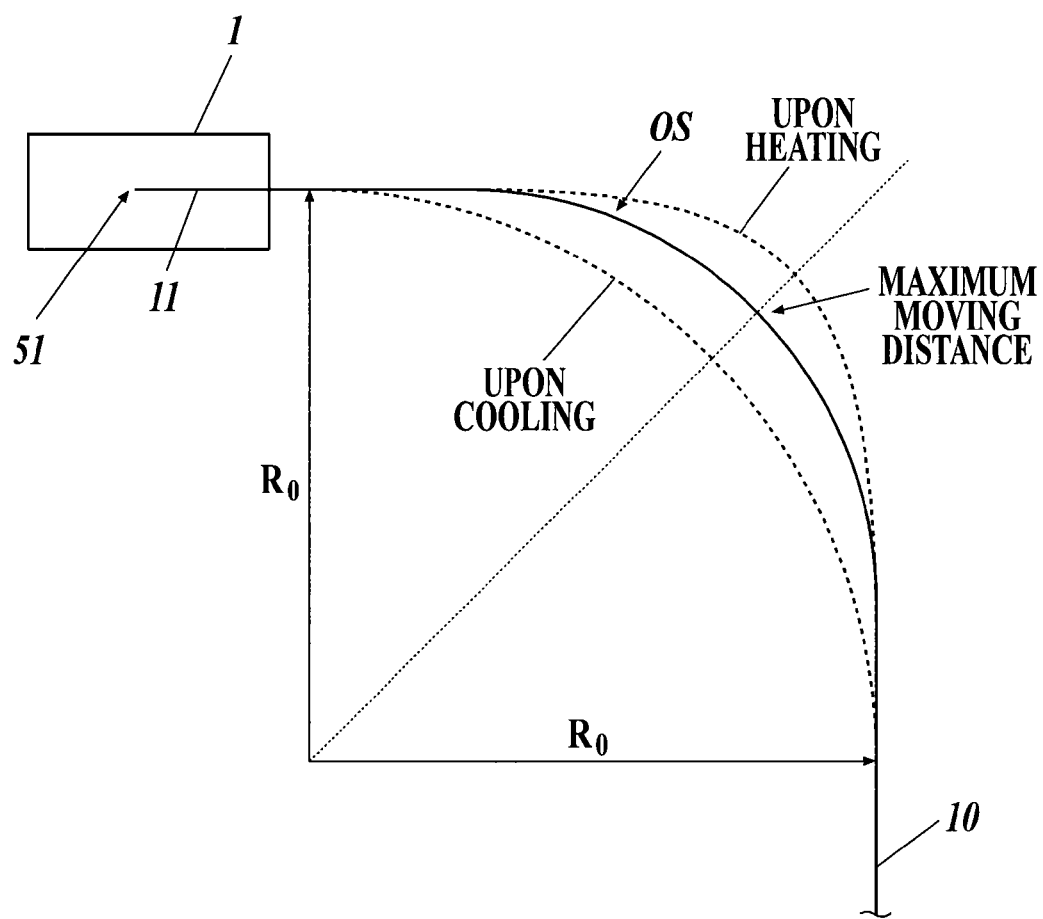
FIG. 12 is a view illustrating a deformed state of the superconducting cable in the offset part in FIG. 11.
Figure 13:
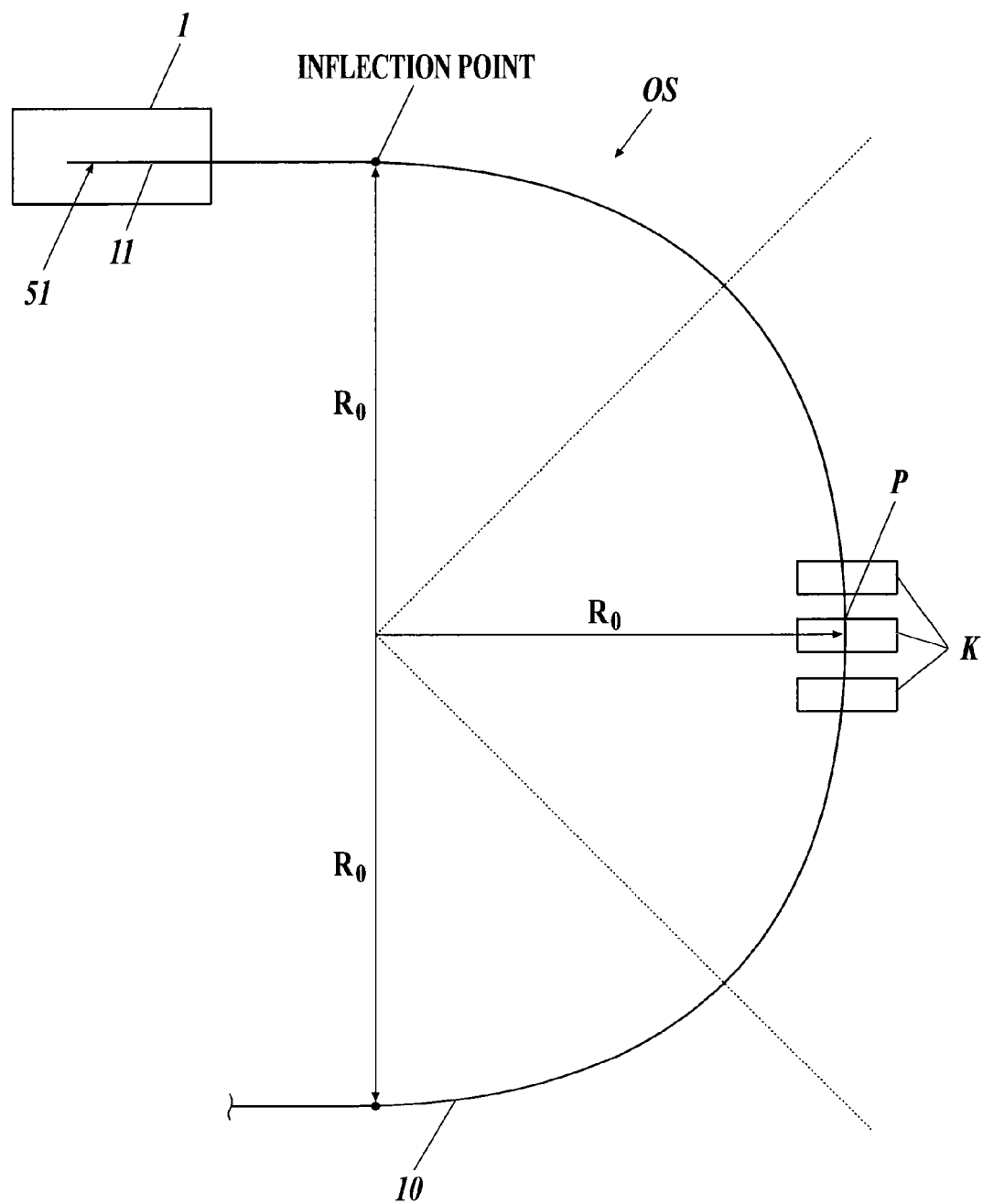
FIG. 13 is a view illustrating an example of the offset part provided near a terminal connecting part.
Figure 14:
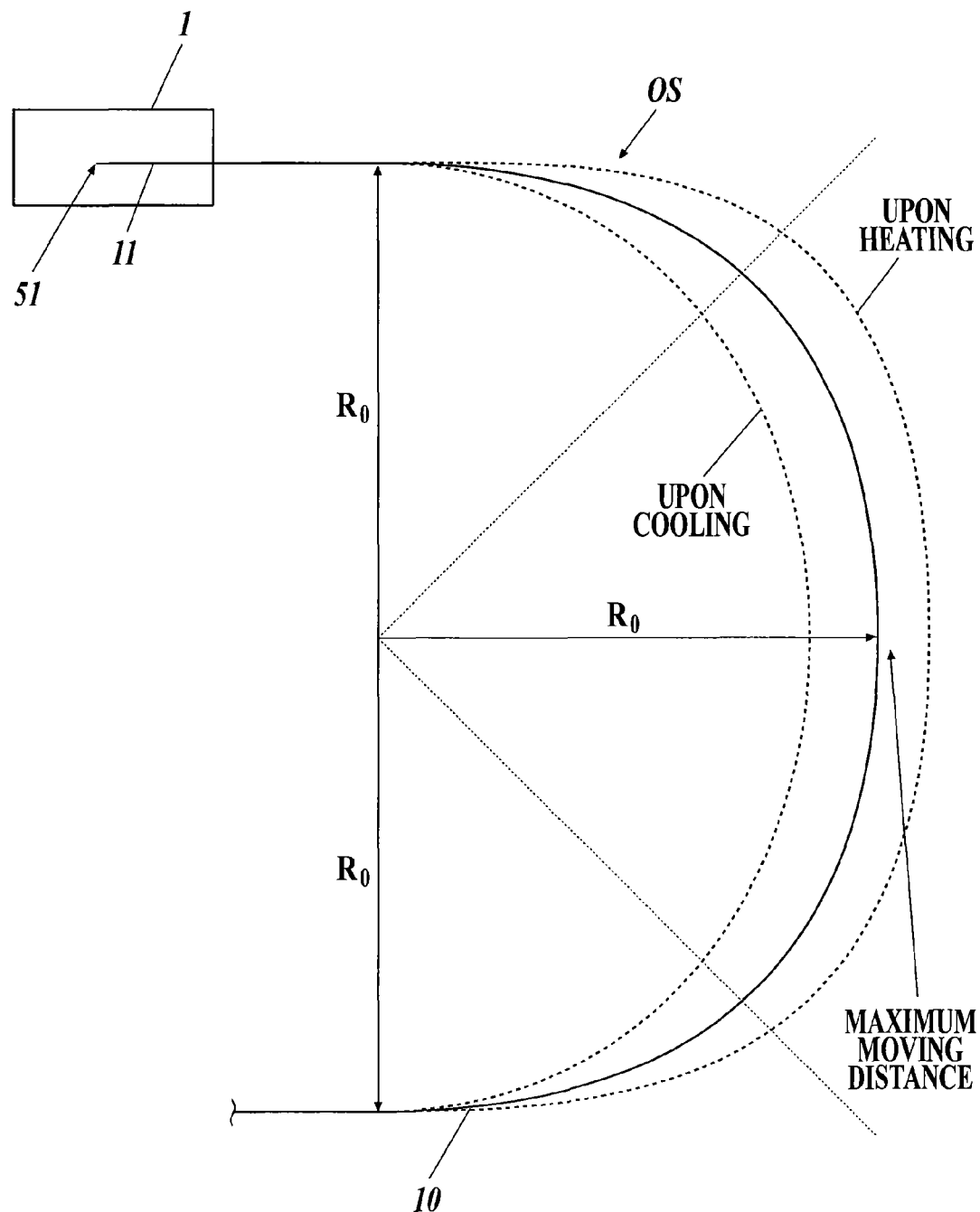
FIG. 14 is a view illustrating a deformed state of the superconducting cable in the offset part in FIG. 13.

Further, although offset parts have been described with the embodiment using examples of the S-shaped offset (see FIGS. 5 and 6), the C-shaped offset (see FIGS. 7 and 8) and the snake offset (see FIG. 9), the present invention is applicable to 90 degree bent-offsets illustrated in FIGS. 11 and 12 and 180 degree bent-offsets illustrated in FIGS. 13 and 14. That is, by fixing an external tube of a superconducting cable in a region including the maximum amplitude part P or a region which sandwiches the maximum amplitude part P, the maximum amplitude part P is included in an immobile region at all times, so that, also for the thermal expansion and contraction length, a length from the maximum amplitude point P to the cable end 51 only needs to be taken into account. In addition, a bend radius Ro in FIGS. 11, 12, 13 and 14 needs to satisfy Ro≥R (allowable bend radius). Further, it is possible to select an offset shape suitable for a site at which the offset is laid according to, for example, spatial limitation of the site at which the offset is laid. Thus, the offset part means a method of laying a cable in a meandering manner, and absorbing thermal expansion and contraction of the cable.

Further, although the embodiment has been described using the offset in the terminal connecting part as an example, the present invention is also applicable to the intermediate connecting part. In this case, for example, by replacing the terminal connecting parts in FIGS. 5 to 9 with an intermediate connecting part, a cable end needs to be set adequately.

Further, the maximum amplitude part P according to the embodiment refers to a point on a curved shape of an arc spaced farthest apart in the vertical direction with respect to a line connecting inflection points of the curve at the end of the curved shape of the arc forming the offset part OS1. Furthermore, the inflection point refers to a point at which a bending direction changes like a curve of a curved shape in an offset part as illustrated in, for example, FIGS. 5 and 9 (black dots). More specifically, the inflection point refers to an inflection of a curve of a curved shape when an offset part is fixed or set again.

The embodiment disclosed herein is exemplary in all respects and should not be regarded as limitations. The scope of the invention is indicated by the appended claims rather than by the foregoing description. All changes that come within the meaning and range of equivalency of the claims are to be embraced within the scope of the invention.

The present application claims priority to Japanese Patent Application No. 2011-024536 filed on Feb. 8, 2011, the including contents of which specification, claims, drawings and summary are incorporated herein by reference in its entirety.

INDUSTRIAL APPLICABILITY

The present invention is configured as described above, and can be utilized as a superconducting cable line.

REFERENCE SIGNS LIST 1, 2 terminal connecting part
3 intermediate connecting part
4 cooling system
10 superconducting cable
11 cable core
12 thermal insulation tube
111 former
112 superconducting conductor layer
L tube conduit
MH manhole
OS (OS1, OS2, OS3) offset part
P maximum amplitude part
S superconducting cable line

The invention claimed is:

1. A superconducting cable line in which a superconducting cable, being formed by housing a cable core in a thermal insulation tube, is laid and connected to a terminal connecting part or an intermediate connecting part, wherein:
the cable core comprises a superconducting conductor layer, and
the thermal insulation tube comprises an external tube and an internal tube,
the superconducting cable line comprsing:
an offset part in which the superconducting cable is laid in a curved-shape so as to absorb a thermal expansion and contraction length of the cable core, the offset part being provided near the terminal connecting part or the intermediate connecting part; and
a fixed part in which a part of the external tube in the offset part is immovably fixed by a fixing member which secures the part of the external tube inside,
wherein the fixed part exists in a region selected from a group consisting of:
a region which includes a point on a curve of an arc apart farthest in a vertical direction with respect to a line connecting inflection points of the curve forming ends of the arc forming the offset part, and a region between the inflection points and the point on the curve, and wherein the supercondcting cable deforms upon cooling, and after the cable core and the internal tube move to an inside of a bend and abut on the external tube, the cable core and the internal tube are pressed against the external tube.

2. The superconducting cable line according to claim 1, wherein:

a difference between a length at 40°C. and a length at −196° C. of the cable core from the point on the curve to an end of the superconducting cable connected to the terminal connecting part or the intermediate connecting part closest to the point on the curve is "a", and an extended length of the cable core, from the length of the cable core at −196° C., which the terminal connecting part or the intermediate connecting part can receive is "x", wherein the point on the curve is arranged in a range satisfying x≥a.

3. The superconducting cable line according to claim 1, wherein:

a length of the cable core at −196° C. from the point on the curve to an end of the superconducting cable in the terminal connecting part or the intermediate connecting part closest to the point on the curve is "X", and an extended length of the cable core, from the length of the cable core at −196° C., which the terminal connecting part or the intermediate connecting part can receive is "x", wherein the point on the curve is arranged in a range satisfying x≥X×0.003.

4. The superconducting cable line according to any one of claims 2 or 3, wherein:

there exists a plurality of curves of arcs forming the offset part, and the fixed part is provided at a position selected from a group consisting of:

on a curve of an arc closest to the terminal connecting part or the intermediate connecting part, on a curve of an arc second closest to the terminal connecting part or the intermediate connecting part, and on a curve of an arc having a longest length between the line connecting the inflection points and the point on the curve among the plurality of curves of the arcs.

5. The superconducting cable line according to claim 1, wherein the offset part has a snake offset structure.

6. The superconducting cable line according to claim 1, wherein the offset part has a bent offset structure.

7. The superconducting cable line according to claim 1, wherein the fixing member is constituted of three or more fixing members.

8. The superconducting cable line according to claim 1, wherein the offset part is provided at a distance of 30 m from the terminal connecting part or the intermediate connecting part.

9. A superconducting cable line in which a superconducting cable, being formed by housing a cable core in a thermal insulation tube, is laid and connected to a terminal connecting part or an intermediate connecting part, wherein:

the cable core comprises a superconducting conductor layer, and the thermal insulation tube comprises an external tube and an internal tube, the superconducting cable line comprising:

an offset part in which the superconducting cable is laid in a curved-shape so as to absorb a thermal expansion and contraction length of the cable core, the offset part being provided near the terminal connecting part or the intermediate connecting part; and a fixed part in which a part of the external tube in the offset part is immovably fixed by three or more fixing members which secure the part of the external tube inside, wherein the superconducting cable deforms upon cooling, and after the cable core and the internal tube move to an inside of a bend and abut on the external tube, the cable core and the internal tube are pressed against the external tube.

* * * * *